(12) United States Patent
Roennow et al.

(10) Patent No.: US 11,172,367 B2
(45) Date of Patent: Nov. 9, 2021

(54) METHOD, DEVICE AND SYSTEM FOR UTILIZING BLOCK CHAIN TO DEFINE TRUSTED CIRCLE

(71) Applicant: Nokia Technologies Oy, Espoo (FI)

(72) Inventors: Troels F. Roennow, Cambridge (GB); Mark M. Clougherty, Chatham, NJ (US); Mu Rong Lin, Saratoga, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/303,215

(22) PCT Filed: May 25, 2016

(86) PCT No.: PCT/FI2016/050359
§ 371 (c)(1),
(2) Date: Nov. 20, 2018

(87) PCT Pub. No.: WO2017/203093
PCT Pub. Date: Nov. 30, 2017

(65) Prior Publication Data
US 2019/0208414 A1  Jul. 4, 2019

(51) Int. Cl.
*H04W 12/00* (2021.01)
*H04W 12/60* (2021.01)
(Continued)

(52) U.S. Cl.
CPC ........ *H04W 12/66* (2021.01); *G06F 16/1824* (2019.01); *H04L 9/0637* (2013.01);
(Continued)

(58) Field of Classification Search
CPC ............ G06F 16/1824; H04L 2209/38; H04L 9/0637; H04L 9/0643; H04W 12/00506;
(Continued)

(56) References Cited

U.S. PATENT DOCUMENTS 8,898,204 B1 †  11/2014  Sathe
2008/0083021 A1*  4/2008  Doane ................... G06F 21/31
726/5

(Continued)

FOREIGN PATENT DOCUMENTS

WO       2015175722       † 11/2015
WO    WO 2015/175722 A1    11/2015

OTHER PUBLICATIONS

Internet Article, "Device democracy, Saving the Future of the Internet of Things", © IBM Corporation 2015, 28 pgs.
(Continued)

*Primary Examiner* — Pankaj Kumar
*Assistant Examiner* — Kokou R Detse
(74) *Attorney, Agent, or Firm* — Harrington & Smith (57) ABSTRACT

A method for utilizing a block chain infrastructure to define a trusted circle including at least two nodes of a plurality of nodes, the method includes receiving, by a first node, notification information identifying a trusted user circle including the first node and a second node, wherein the first node and the second node are configured to define a private block chain; and maintaining private block chain data within the trusted user circle according to pre-defined settings, wherein the private block chain data is divided between nodes of the trusted user circle based on the pre-defined settings.

19 Claims, 4 Drawing Sheets

(51) Int. Cl.
| | |
|---|---|
| *H04W 4/70* | (2018.01) |
| *H04W 12/086* | (2021.01) |
| *H04W 4/80* | (2018.01) |
| *G06F 16/182* | (2019.01) |
| *H04L 9/06* | (2006.01) |
| *H04W 80/02* | (2009.01) |
| *H04W 88/16* | (2009.01) |
| *H04W 12/10* | (2021.01) |

(52) U.S. Cl.
CPC ............ *H04L 9/0643* (2013.01); *H04W 4/70* (2018.02); *H04W 4/80* (2018.02); *H04W 12/086* (2021.01); *H04W 80/02* (2013.01); *H04W 88/16* (2013.01); *H04L 2209/38* (2013.01); *H04W 12/10* (2013.01)

(58) Field of Classification Search
CPC ... H04W 12/0806; H04W 12/10; H04W 4/70; H04W 4/80; H04W 80/02; H04W 88/16
USPC .......................................................... 370/329
See application file for complete search history.

(56) References Cited

U.S. PATENT DOCUMENTS

| | | | |
|---|---|---|---|
| 2010/0082550 A1* | 4/2010 | Cong ................... | G06F 12/0638 707/672 |
| 2016/0128043 A1† | 5/2016 | Shuman et al. | |
| 2016/0255245 A1* | 9/2016 | Ishibashi ............ | H04N 1/00244 358/1.14 |
| 2017/0046526 A1* | 2/2017 | Chan .................... | G06Q 20/102 |
| 2017/0237773 A1* | 8/2017 | Wallace .............. | H04L 63/1425 726/22 |
| 2017/0255950 A1* | 9/2017 | Krug ...................... | G06N 7/005 |
| 2019/0075020 A1* | 3/2019 | Leal Monteiro ...... | H04L 9/3239 |

OTHER PUBLICATIONS

Pannikar, Sanjay, "ADEPT: An IoT Practitioner Perspective Draft Copy for Advance Review", © IBM 2015, 18 pgs.
Christidis, Konstantinos, et al., "Blockchains and Smart Contracts for the Internet of Things", © 2016 IEEE, 12 pgs.

\* cited by examiner
† cited by third party

METHOD, DEVICE AND SYSTEM FOR UTILIZING BLOCK CHAIN TO DEFINE TRUSTED CIRCLE

This patent application is a U.S. National Stage application of International Patent Application Number PCT/FI2016/050359 filed May 25, 2016, which is hereby incorporated by reference in its entirety.

TECHNICAL FIELD

The present application generally relates to trusted circles, block chains, distributed ledgers, IoT devices and cryptographic protocols.

BACKGROUND

This section illustrates useful background information without admission of any technique described herein representative of the state of the art.

Internet of Things (IoT) is a network of physical objects, such as devices, vehicles, buildings and other items, embedded with electronics, software, sensors, and network connectivity that enables these objects to collect and exchange data. IoT allows objects to be sensed and controlled remotely across existing network infrastructure, enabling more direct integration of the physical world into computer-based systems, and resulting in improved efficiency, accuracy and economic benefit. If IoT is augmented with sensors and actuators, the technology becomes an instance of the more general class of cyber-physical systems, which also encompasses technologies such as smart grids, smart homes, intelligent transportation and smart cities. Each thing is uniquely identifiable through its embedded computing system but is able to interoperate within the existing Internet infrastructure.

A block chain is a distributed database that maintains a continuously growing list of data records hardened against tampering and revision. It consists of data structure blocks, which hold exclusively data in initial block chain implementations, and both data and programs in some implementations, with each block holding batches of individual transactions and the results of any block chain executables. Each block contains a timestamp and information linking it to a previous block.

The block chain is seen as the main technical innovation of bitcoin, where it serves as the public ledger of all bitcoin transactions. Bitcoin is peer-to-peer, every user is allowed to connect to the network, send new transactions to it, verify transactions, and create new blocks, which is why it is called permissionless. This original design has been the inspiration for other cryptocurrencies and distributed databases.

As a block chain grows, the space requirement becomes large. In some cases the block chain may exceed the capacity of the node. This is particularly true for small devices such as those found in IoT (Internet of Things) but may also apply to a larger node such as those you would expect to see in the banking industry, for example.

Thus, a technical solution is needed to solve the problem of handling large data sets with block chains, especially within IoT with data authenticity.

SUMMARY

Various aspects of examples of the invention are set out in the claims.

According to a first example aspect of the present invention, there is provided a method for utilizing a block chain infrastructure to define a trusted circle comprising at least two nodes of a plurality of nodes, the method comprising:

receiving, by a first node, notification information identifying a trusted user circle comprising the first node and a second node, wherein the first node and the second node are configured to define a private block chain; and maintaining private block chain data within the trusted user circle according to pre-defined settings, wherein the private block chain data is divided between nodes of the trusted user circle based on the pre-defined settings.

In an embodiment, the method further comprises:
receiving, by a first node, notification information comprising user identification information associated with the trusted user circle.

In an embodiment, the notification information is received via at least one of the following short-range communication protocol, such as:

NFC (Near Field Communication), Bluetooth™, Wi-Fi, Ethernet, ZigBee, powerline communications, and USB (Universal Serial Bus).

In an embodiment, the method further comprises:
receiving, by a first node, instructions information to collaborate on a data storage comprising private block chain data of the trusted user circle.

In an embodiment, the instructions information is received using a block chain transaction.

In an embodiment, the instructions information is received using a jumper or a switch being set within the first node.

In an embodiment, the instructions information is received via at least one of the following short-range communication protocol, such as:

NFC (Near Field Communication), Bluetooth™, Wi-Fi, Ethernet, ZigBee, powerline communications, and USB (Universal Serial Bus).

In an embodiment, the method further comprises facilitating verification and authentication of transactions of the nodes of the trusted user circle according to the terms of the pre-defined settings of the private block chain.

In an embodiment, the pre-defined settings comprise at least one of an agreement and a smart contract of the trusted user circle.

In an embodiment, the first node and the second node comprises IoT (Internet of Things) device.

In an embodiment, the private block chain data is divided between nodes of the trusted user circle using a self-balancing binary search tree.

In an embodiment, the self-balancing binary search tree comprises an AVL tree.

In an embodiment, the private block chain data is divided between nodes of the trusted user circle using a Patricia tree.

In an embodiment, the trusted user circle comprises a gateway node configured to control access of other nodes within the trusted user circle to external network outside the trusted user circle.

In an embodiment, the method further comprises: maintaining, by each node of the trusted user circle, information of other trusted nodes of the trusted user circle.

In an embodiment, the information of other trusted nodes comprises a public key of each trusted node.

In an embodiment, the information of other trusted nodes comprises a node identifier of a trusted node.

In an embodiment, the node identifier comprises a MAC (Media Access Control) address.

In an embodiment, the method further comprises:

generating transaction data by a third node not belonging to the trusted user circle;

hashing the transaction data using a cryptographic hashing function, to create a cryptographic hash block;

recording the cryptographic hash block associated with a digital signature of the third node to a public block chain; and transmitting the transaction data to the gateway node for verification.

In an embodiment, the method further comprises:

recording the cryptographic hash block associated with the digital signature of the third node to the private block chain in response to the verification by the gateway node.

In an embodiment, the private block chain data is divided between nodes of the trusted user circle, wherein first node related block chain data is maintained by the first node, and second node related block chain data is maintained by the second node.

In an embodiment, the private block chain data is maintained by the gateway node.

In an embodiment, the method further comprises:

assigning a node identifier to each node of the trusted user circle.

In an embodiment, the node identifier comprises a public key.

In an embodiment, the node identifier comprises a private key.

In an embodiment, the method further comprises:

assigning a trusted user circle identifier to the trusted user circle.

In an embodiment, the method further comprising:

routing transactions from nodes external to the trusted user circle based on the trusted user circle identifier.

In an embodiment, the nodes of the trusted user circle are connected via a local short-range communication interface.

In an embodiment, at least one node of the trusted user circle is connected to a wide area communication interface.

In an embodiment, the local short-range communication interface comprises a wired or wireless interface.

In an embodiment, the wide area communication interface comprises a public network, such as Internet.

In an embodiment, the wired interface comprises at least one of the following:
Ethernet;
a Universal Serial Bus (USB); and
a High-Definition Multimedia Interface (HDMI).

In an embodiment, the wireless interface comprises at least one of the following:
a Bluetooth™ network;
a Radio Frequency Identification (RF-ID) network;
a near field communication (NFC) network;
a wireless local area network; and
a IEEE 802.11 network.

In an embodiment, the block chain is configured to be protected by a proof algorithm comprising at least one of a proof-of-work, proof-of-stake and majority-voting algorithm.

According to a second example aspect of the present invention, there is provided a device comprising:
a communication interface for transceiving information;
at least one processor; and
at least one memory including computer program code;
the at least one memory and the computer program code configured to, with the at least one processor, cause the device to:
receive notification information identifying a trusted user circle comprising a first node and a second node,
wherein the first node and the second node are configured to define a private block chain; and
maintain private block chain data within the trusted user circle according to pre-defined settings, wherein the private block chain data is divided between nodes of the trusted user circle based on the pre-defined settings.

In an embodiment, the device comprises an IoT (Internet of Things) device.

In an embodiment, the device comprises a gateway node.

In an embodiment, the device comprises at least one of the following:
an industrial machine;
a sensor;
an utility meter;
a personal computer;
a smartphone;
a PDA;
an Internet tablet;
a network attached storage (NAS); and
a user device.

According to a third example aspect of the present invention, there is provided computer program embodied on a computer readable non-transitory medium comprising computer executable program code, which when executed by at least one processor of a device, causes the device to:
receive notification information identifying a trusted user circle comprising a first node and a second node, wherein the first node and the second node are configured to define a private block chain; and
maintain private block chain data within the trusted user circle according to pre-defined settings, wherein the private block chain data is divided between nodes of the trusted user circle based on the pre-defined settings.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 5 of the drawings. In this document, like reference signs denote like parts or steps.

In this document, the terms couple and connect may refer to direct contact between components or to coupling through some intervening component(s).

Figure 1:
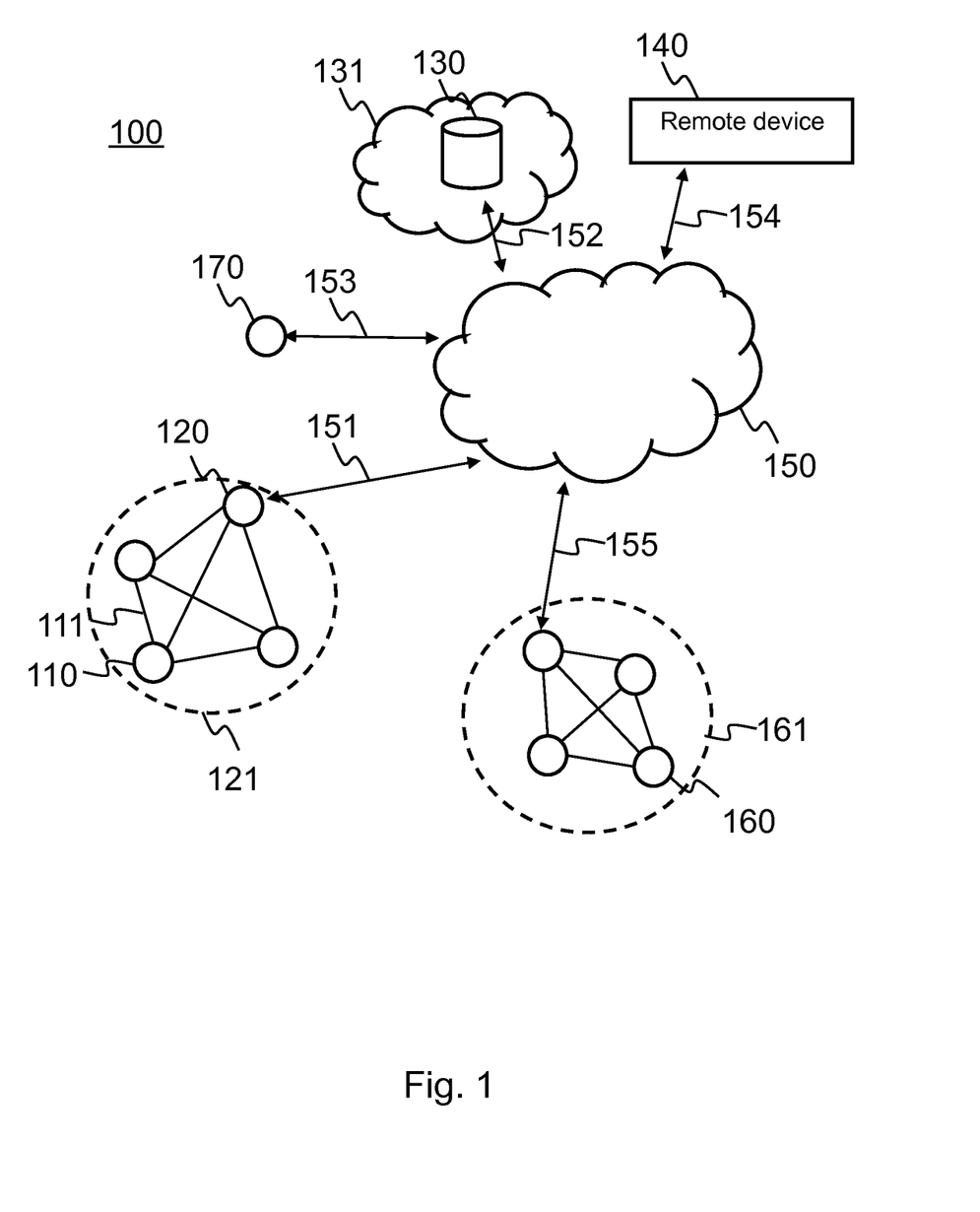
FIG. 1 shows a schematic drawing of a system of an example embodiment.

FIG. 1 shows a schematic drawing of a system 100 of an example embodiment.

At the minimum, the system 100 comprises at least one node 110, 120, 160, 170 for transceiving data within the system 100. The node 110, 120, 160, 170 may comprise a user device, an IoT (Internet of Things) device, a sensor, an integrated device or home electronics device, for example. The user device may comprise a wrist-based device, a belt device, clothing-integrated device, skin-attached sensor, or a separate personal health device such as a thermometer or a blood pressure meter, a heart rate monitor, a blood sugar level sensor, a lactate level sensor, and an oxygen saturation sensor, for example.

In an embodiment, a block chain infrastructure may be utilized to define a trusted circle 121 comprising at least two nodes 110, 120 of a plurality of nodes.

A first node 110 may receive a notification information identifying a trusted user circle 121 comprising the first node 110 and a second node 120, wherein the first node 110 and the second node 120 are configured to define a private block chain. Private block chain data is maintained within the trusted user circle 121 according to pre-defined settings, wherein the private block chain data is divided between nodes 110, 120 of the trusted user circle 121 based on the pre-defined settings.

In an embodiment, nodes correspond to devices. Thus, devices 110, 120 are paired and in response to pairing the devices 110, 120 collaborate on storing and securing the contents of a distributed ledger. This technique enables, for example, home devices with little storage (such as general IoT nodes) to collaborate on forming one "super" node corresponding to the trusted user circle 121 with capacity similar to that of an ordinary node hosted on a PC or in a cloud. Furthermore also other resources may be shared within the trusted user circle 121, such as hashing power, or listing of peers, for example.

Any node 110, 120, 160, 170 may generate transaction data relating to the node and hash the data using a cryptographic hashing function, to create a cryptographic hash block.

In an embodiment, the trusted user circle 121 may comprise a gateway node 120 configured to control access of other nodes within the trusted user circle 121 to external network 150 outside the trusted user circle 121.

In an embodiment, the gateway node may receive data without hashing from other nodes within the trusted user circle 121 and carry out the data hashing using a cryptographic hashing function, to create a cryptographic hash block.

A node 110, 120, 160 may receive notification information comprising user identification information associated with the trusted user circle 121, 161. The notification information may be received, for example, from a gateway node 120 over a local connection 111, or over a wide area connection 150, 151, 154 from a remote device 140. The local connection may be implemented, for example, via at least one of the following short-range communication protocol: NFC (Near Field Communication), Bluetooth™, Wi-Fi, Ethernet and USB (Universal Serial Bus).

Furthermore, a node 110, 120, 160 may receive instructions information to collaborate on a data storage comprising private block chain data of the trusted user circle 121, 161.

The system 100 may comprise nodes 140, 170 that do not belong to any trusted circle 121, 161. Such nodes 140, 170 may communicate with other nodes within the system 100. The node 170 may be connected to a public network 150 over connection 153. The external device 140 may be connected to a public network 150 over connection 154.

In an embodiment, the nodes 110, 120 are integrated as a single device. Alternatively, the gateway node 120 and another node 110 are separate entities and connected via a local short-range communication interface, and the gateway node 120 and a remote node 140 are connected via a wide area communication interface 150, for example. It is also possible to arrange the nodes to be releasably connectable to each other so that in one operating mode they are integrated together and in second operating mode they are separate entities.

After hashing, either the trusted circle node 110 or the gateway node 120 is configured to record the cryptographic hash block associated with a digital signature to a block of a private block chain.

In an embodiment, transaction data may be encrypted before hashing. For example, asymmetrical encrypting of the data may be carried out by the trusted node 110 or the gateway node 120. The encrypted data may be stored to either the node 110 or the gateway node 120. In case the system comprises a gateway node 120, it may be beneficial to store most of the trusted circle related data within the gateway node 120 due to it is easier to arrange larger memory and storing capacity within the gateway node 120 than within the trusted node 110.

An owner of block chain nodes 110, 120 may have many nodes (as for instance could be the case in IoT). While the owner may not trust any device 160, 170 he does not own, he may trust his own devices 110, 120. Thus a trusted circle of nodes 121 may be established.

To associate a plurality of nodes to belong in a same trusted circle, following procedures may be applied.

First, let's assume that node 110 is to be added to the system 100. After first start up, the node 110 remains inactive (it may be syncing, but otherwise not operational) until such a point where the node 110 receives notification about who the owner is. This may be accomplished through a NFC, Bluetooth, USB or short-range communication protocol over connection 111 from another, already trusted node, such as node 120, or a remote device 140 of the owner.

Figure 2:
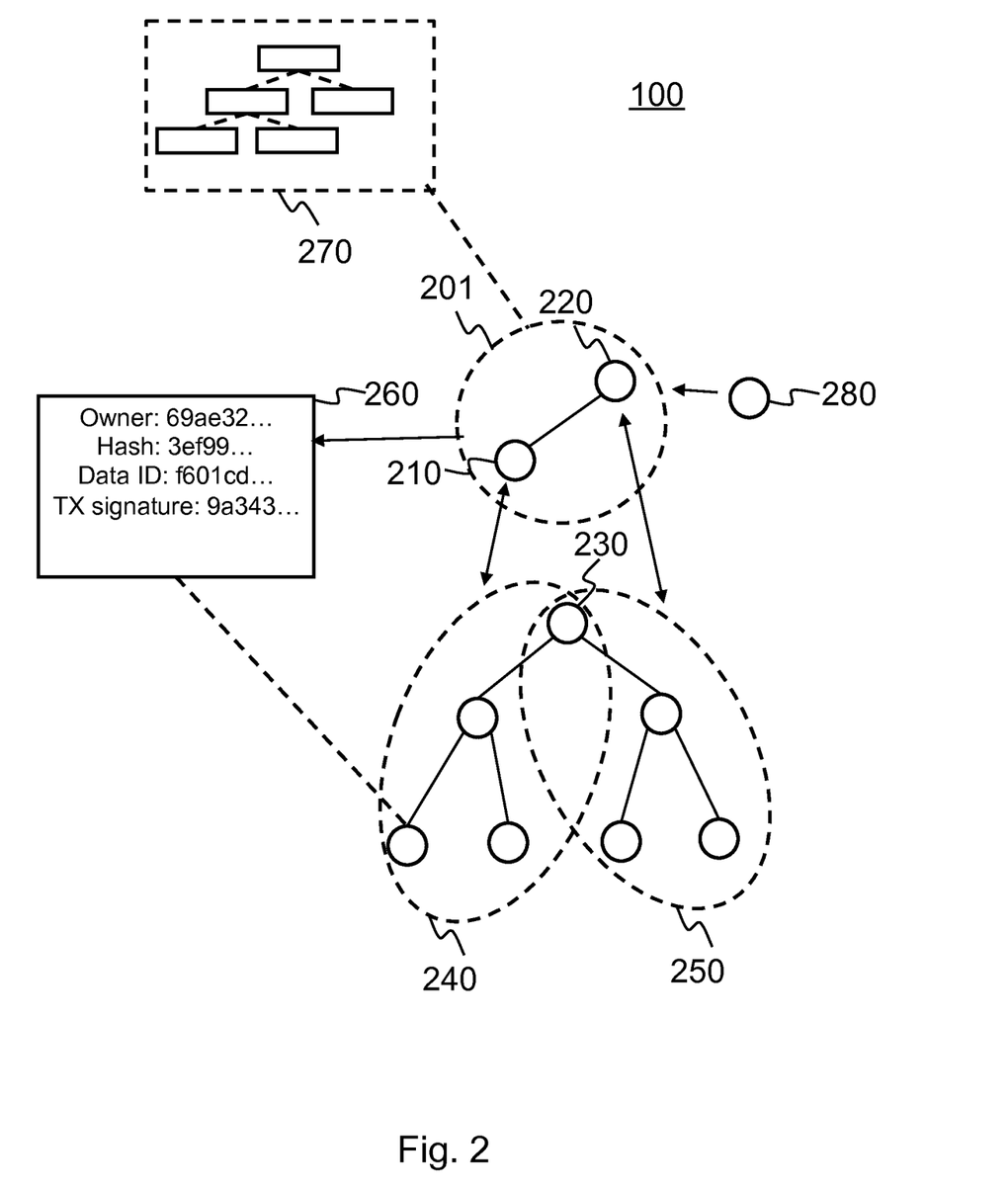
FIG. 2 shows another schematic drawing of a system of an example embodiment.

Second, nodes 110, 120 of the same owner may receive instructions to collaborate on data storage. Such an instruction may come in the form of a block chain transaction, a jumper or switch being set or through a communication interface such as NFC, Bluetooth, or USB. After receiving these instructions, the nodes 110, 120 will divide block chain data amongst them and will only keep data according to their own local agreement. Such an agreement may be made using a database, a local block chain or be a part of global block chain. In case of the latter, other nodes would be able to read the agreement and direct the transactions to the relevant nodes. The principle of trusted circles is illustrated in FIG. 2 below.

In an embodiment, no gateway node 120 is required in the system 100 but the nodes 110, 120 are configured to generate transaction data and further take care of encrypting the data if needed, as well as hashing the data using a cryptographic hashing function, to create a cryptographic hash block, to record the cryptographic hash block associated with a digital signature of a node 110, 120 to a block of a digital block chain and to transmit the data item to a peer device, for example.

The local short-range communication interface 111 may comprise wired or wireless interface. The wide area communication interface may comprise a public network 150, such as Internet.

In an embodiment, the wired interface 111 comprises, for example, at least one of the following: a Universal Serial Bus (USB); and a High-Definition Multimedia Interface (HDMI). The wireless interface 111 comprises, for example, at least one of the following: a Bluetooth™ network; a Radio Frequency Identification (RF-ID) network; a near field communication (NFC) network; a wireless local area network; and a IEEE 802.11 network.

In an embodiment, the first node 110 and the second node 120 may be implemented as separate devices communicating with each other over a local connection 111. The local connection 111 may comprise also other wireless non-cellular connection. The wireless non-cellular connection may comprise industrial, scientific and medical (ISM) radio bands that are radio bands (portions of the radio spectrum) reserved internationally for the use of radio frequency (RF) energy for industrial, scientific and medical purposes, for example. Alternatively, the first node 110 may be comprised by the second node 120. The trusted circle 121 may also correspond to a system within user's home, wherein the first node 110 and the second node communicate with each other over a local connection 111.

In an embodiment, a communication interface module of at least one of the nodes 110, 120, 160, 170 may comprise location modules for tracking location information of the node. Such location modules may comprise a module for providing a connection to satellite based global positioning system (e.g. GPS), a module for cellular based positioning system, a module for indoor positioning, a module for wireless non-cellular positioning system (e.g. Wi-Fi) or a module for hybrid positioning system, for example.

In an embodiment, device gateway node 120 may be connected over a wireless or wired connection 151 to a wide area network 150, such as Internet. Router apparatuses (not shown) may be used for providing the access 151 to a wide area network 150. The access 151 may comprise cellular or non-cellular connection. The access 152, 153, 154, 155 may correspond to the access 151.

In an embodiment, the system 100 comprises a server apparatus 130, which comprises a storage device for example for storing and providing user data, service data and subscriber information, over data connection 152. The service data may comprise configuration data, account creation data, transaction data of the nodes, and digital block chain data, for example.

In an embodiment, a proprietary application in the node 110, 120, 140, 160, 170 may be a client application of a service whose server application is running on the server apparatus 130 of the system 100. The proprietary application may capture or process transaction data for the service and provide the transaction data hashing, block chain recording and transceiving for the service. In an embodiment, information from the node 110 and/or the gateway node 120 to the remote device 140 and/or the server 130 is transceived via the connections 111, 150, 151, 152, 154 automatically. Thus the user of the nodes 110, 120 may not need to do any control for the service. The system server 130 may also maintain account creation process details for the service, such as attaching new gateway nodes 120 or nodes 110 to the system 100 as well as maintaining authorized users and devices.

In an embodiment, history data of earlier transaction data, user profiles, settings, agreements, smart contracts, and block chains may be maintained at the server 130, for example.

The server 130 may also provide a cloud service 131 for the data of devices 110, 120, 140, 160, 170. Optionally, further devices may be added, such as peripheral devices for maintaining, providing or processing node 110, 120, 160, 170 data and communication devices for connecting the peripheral devices to the system 100.

The node 110 may operate as a sensor, such as a biometric sensor.

The node 110 may also be applied to human skin like a temporary tattoo that can warn users exercising that they are about to become completely exhausted described, the state also described as "bonk" or "hit the wall". Thus, stamina and fitness of the user may also be monitored.

The node 110, 120 may comprise a user interface or alternatively may not comprise user interface at all but instead the node 110, 120 is remotely operated via the remote device 140. The node 110, 120 is capable of locally executing software program code. The software program code may be a client application of a service whose server application is running on a server 130 of the system 100.

Embodiments of this invention describe how to implement a system 100 where nodes 110, 120 can store sensitive information in such a way that a remote device 140 later on can confirm the authenticity of the data. The embodiments may use an open distributed ledger to keep a record of hashes of encrypted user data. The data may be encrypted asymmetrically such that anyone can redo the encryption of the raw data. After encryption the data is hashed and the result is added onto a ledger. Additionally a trusted circle 121 for certain nodes 110, 120 can be created and block chain data divided between the nodes 110, 120 within the trusted circle 121.

A node 110 may be located on the user or on the user household device, a gateway node 120 may be located at user's home or as user's personal smart device, and a remote device 140 may be located at external location, for example summer cottage or workplace. The node 110 may continuously collect and encrypt data from the user. The data may include such things a blood pressure, heart rhythm, temperature of household etc. The data may be encrypted asymmetrically and pushed to the gateway node 120 where it is stored. A hash of the asymmetrically encrypted data may be computed by any of the nodes 110, 120 and added to a block chain. The block chain is protected by a proof algorithm, such as proof-of-work, proof-of-stake or the like. The user can now at any time decrypt the data and send it to a third party 130, 140 (in practice this may be automated, and the user simply chooses which third parties may access which types of data on a continuous basis). The third party 130, 140 can then verify that this was indeed the original data that was collected by the node 110, by first asymmetrically encrypting it, computing the hash and verifying its presence on the block chain.

The default behavior of the nodes 110, 120 is to not trust other nodes 160, 170. Hence, the nodes 110, 120 would always store the full block chain and corresponding data. The owner of the devices 110, 120 can dictate that how the devices 110, 120 utilize shared storage, but nodes 110, 120 cannot have distributed storage outside of the owner's devices. That is to say, if one owner has a couple of nodes 110, 120 and another owner has a couple of nodes 160, 170, the first owner can make his/her nodes collaborate, but cannot get them to share storage with the second owner's nodes. In some implementations it may be possible for two owners to express mutual consent for their devices to collaborate.

FIG. 2 shows another schematic drawing of a system of an example embodiment.

A trusted circle 201 comprises two trusted nodes 210, 220. The data may be divided between the nodes 210, 220 in various ways. The data may comprise block chain and corresponding data.

Initially, instructions information for a node 210 to be paired with trusted node 220 may be received using a block chain transaction. Alternatively, the instructions information is received using a jumper or a switch being set within the first node 210.

Facilitation of verification and authentication of transactions of the nodes 210, 220 of the trusted user circle 201 may be carried out according to the terms of the pre-defined settings of the private block chain 230, 240, 250. The pre-defined settings may comprise at least one of an agreement and a smart contract of the trusted user circle 201.

In an embodiment, the first node 210 and the second node 220 comprise IoT (Internet of Things) devices of a user.

In an embodiment, the private block chain 230, 240, 250 data is divided between nodes of the trusted user circle 210, 220 using a self-balancing binary search tree.

In an embodiment, the self-balancing binary search tree comprises AVL tree of FIG. 2.

In an embodiment, the private block chain data is divided between nodes of the trusted user circle using a Patricia tree.

In an example embodiment, an AVL tree is used. Such implementation may occasionally require large amount of data to be transceived between the nodes 210, 220 and should only be used when this is possible. In other cases it may be more feasible to use a Particia tree (also known as a Radix tree). This particular choice of abstract data type makes it easy to route the data updates to the correct node and does not have overhead due to data exchange upon insertion/deletion. In FIG. 2 it is illustrated how the two nodes 210, 220 may share the data between them.

At the time where a proof-of-work should be found, the nodes 210, 220 may combine the hashes from the transactions to form a Merkle tree, or simply keep a hash of the state of the full storage system, which will enter the next block. In some implementations it may be feasible to do both as this allows to implement a fast-forward mechanism that makes new nodes catch up with the network in much less time than what they would need if only the Merkle hash of the transactions are stored in the blocks.

In addition to distributing the storage, the nodes 210, 220 may also distribute hash power. This may happen within a trusted circle 201 and it may be done across subsets of the networks by making pools, for example. Unlike the storage, distribution of the hash power does not require trust and can therefore easily be implemented in many various scenarios.

It is worth noting that nodes 210, 220 in the trusted circle 201 may not be equal in computational power and/or storage capacity. Nodes may also fulfill different roles and/or additional roles to their block chain capabilities. For instance, in one scenario one node may act as a gateway (or router). In an IoT setting, such gateway node may store most of the block chain while the remaining nodes are fairly low-power and low capacity devices that only store small parts of the block chain. Within this scenario, the gateway may ensure that new nodes are unable to communicate with the outside world until being accepted as part of a cluster.

In an embodiment, imbalanced situations may also be covered, wherein first node related block chain data is maintained by a second node together with the second node related block chain data.

Since this protocol has small clusters 201 of nodes sharing storage one obtains a higher level of stability in comparison with building a fully distributed storage as a feature of the ledger. For instance, it is well known that AVL lookup tables are likely to break down once scaled to a large enough size. Making clusters for different users gives incentive for every user to keep a full record of the chain since they cannot earn rewards without it and that's a crucial difference to a more general scheme where a user can earn incentives even without a full record.

In an embodiment, to keep track of trusted nodes 210, 220 in the trusted circle 201, different schemes may be implemented. In a first version, one would simple keep a local text-file on every node 210, 220 to keep track of trusted peers. Propagating new trusted peers would then be done by accepting a list of a new peer's public key and, optionally, other identifiers such as MAC addresses etc., from already trusted peers. To ensure tamper resistance of the peer list one may include a protocol such as to use the already existing block chain to secure and verify received peer lists. In another embodiment, one may simply use a distributed database amongst the peers. This database can either be deployed using a regular database systems or a local block chain. If a local block chain is used, one may add the Merkle hashes onto a global block chain to verify the states of the local block chain for verifying information.

In an embodiment, each node 210, 220 of the trusted user circle 201 may maintain information of other trusted nodes 210, 220 of the trusted user circle 201. The information of other trusted nodes may comprise a public key of each trusted node. The information of other trusted nodes may also comprise a node identifier of a trusted node such as MAC (Media Access Control) address.

In an embodiment, transaction data may be generated by a third node 280 not belonging to the trusted user circle 201. The transaction data is hashed using a cryptographic hashing function, to create a cryptographic hash block, the cryptographic hash block associated with a digital signature of the third node 280 is transmitted to a public block chain, and the transaction data is transmitted to the trusted node 210, 220 for verification. The cryptographic hash block associated with the digital signature of the third node 280 may be recorded to the private block chain in response to the verification by the trusted node 210, 220.

In an embodiment, the private block chain data is divided between nodes 210, 220 of the trusted user circle 201, wherein first node related block chain data 240 is maintained by the first node 210, and second node related block chain data 250 is maintained by the second node 220.

In an embodiment, the private block chain related data 230, 240, 250 is maintained by the gateway node only. The related data may correspond to database of the related data.

In an embodiment, a node identifier is assigned to each node 210, 220 of the trusted user circle 201, wherein the node identifier may comprise a public key.

Furthermore, a trusted user circle identifier may be assigned to the trusted user circle 201. Routing transactions from nodes 280 external to the trusted user circle 201 may base on the trusted user circle identifier.

The transaction data may be stored at a node 210, 220 that adds a hash of an asymmetric encryption on to generate a hash block 260. In some embodiments, the data may be stored directly on the node 210, 220.

The hash block 260 of the asymmetrically encrypted data may be computed and added to a private block chain 230-250. Based on agreed settings, the hash block is added for example to portion 240 of the private block chain that is maintained by a node 210 responsible for the particular transaction data, the hash block 260 and associated data. The private block chain 230-250 may be protected by a proof algorithm, such as proof-of-work, proof-of-stake or the like. The user can now at any time decrypt the data and send it to a third party within a network system 100 (in practice this may be automated, and the user simply chooses which third parties may access which types of data on a continuous basis). The third party can then verify that this was indeed the original data that was collected by the node 210, 220, by first asymmetrically encrypting it, computing the hash and verifying its presence in the private block chain. Nodes 210, 220 may be nodes in a network of nodes, such as a network for Internet of Things (IoT). In an embodiment, the private block chain 230-250 is implemented using Merkle trees. Aggregating hash values of the exchanged data in a Merkle tree is efficient, since the "root" 230 of the Merkle tree provides a compressed digest of all individual hash values, so that the Merkle tree reduces storage requirements.

A distributed ledger is a database that can securely record user transaction data for sharing across a network through entirely transparent updates of information.

The private block chain data structure 230-250 is an ordered, back-linked list of blocks of transactions. The private block chain 230-250 can be stored as a flat file, or in a simple database. Blocks 260 are linked "back" each referring to the previous block in the chain. The private block chain 230-250 is often visualized as a vertical stack, with blocks layered on top of each other and the first block serving as the foundation of the stack. The visualization of blocks stacked on top of each other results in the use of terms such as "height" to refer to the distance from the first block, and "top" or "tip" to refer to the most recently added block.

Although a block has just one parent, it can temporarily have multiple children. Each of the children refers to the same block as its parent and contains the same (parent) hash in the "previous block hash" field. Eventually, only one child block becomes part of the private block chain 230-250. Even though a block may have more than one child, each block can have only one parent. This is because a block has one single "previous block hash" field referencing its single parent.

Each block within the private block chain 230-250 may be identified by a hash, generated e.g. using a SHA256 cryptographic hash algorithm on the header of the block. Each block also references a previous block, known as the parent block, through the "previous block hash" field in the block header. In other words, each block contains the hash of its parent inside its own header. The sequence of hashes linking each block to its parent creates a chain going back all the way to the first block ever created, known as the genesis block.

In an embodiment, each block in the private block chain 230-250 contains a summary of all the transactions in the block, using a Merkle tree. The Merkle tree 230-250, also known as a binary hash tree, is a data structure used for efficiently summarizing and verifying the integrity of large sets of data. Merkle trees are binary trees containing cryptographic hashes 260. The term "tree" is used in computer science to describe a branching data structure, but these trees are usually displayed upside down with the "root" at the top and the "leaves" at the bottom of a diagram.

In an embodiment, the Merkle tree is omitted and blocks of "transactions" are linked directly together in the private block chain 230-250.

The private digital block chain 230-250 corresponds to a distributed cryptographic ledger shared amongst all trusted nodes participating in the trusted circle 201, over which every successfully performed transaction is recorded.

In an embodiment, the private block chain 230-250 may be integrated to a public block chain 270.

In an embodiment, received transaction data from a gateway node device 220 (originating or received from the other node 210 of the trusted circle 201) at a remote device 140 (FIG. 1) can be verified by the remote device 140. The remote device 140 may be a computer, server farm, an embedded device or special purpose circuit, for example.

In an embodiment, one may want to store the data unencrypted in which case the asymmetric encryption can be omitted in both cases. In some embodiments the transaction data may be encrypted and hashed by the node 210, 220 itself and only accepted onto the ledger 230-250, 270 if a node 210 public key is verified as a certified device.

In an embodiment, each IoT (Internet of Things) device, or node, 110, 120, 160, 170, 210, 220 comprises a private key for asymmetric cryptography. The asymmetric cryptographic system uses pairs of keys: public keys that may be disseminated widely paired with private keys, which are known only to the owner. There are two functions that can be achieved: using a public key to authenticate that a message originated with a holder of the paired private key; or encrypting a message with a public key to ensure that only the holder of the paired private key can decrypt it.

The private key may be configured to the node by the manufacturer or re-seller of the node. Then, when joining a trusted circle, the node may update its public key to the gateway node. Alternatively, a node may receive a private key from the gateway node when joining the trusted circle and the corresponding public key made available by the gateway node.

In an embodiment, a remote device 140 (FIG. 1) receives transaction data from a node 210, 220. The remote device 140 hashes the transaction data using a cryptographic hashing function, to create a cryptographic hash block and fetches a reference cryptographic hash block from private block chain 230-250. The remote device 140 may then compare the cryptographic hash block to the fetched block from the private block chain 230-250. The transaction data may be verified in response to finding a matching cryptographic hash block in a private block chain 230-250 based on the comparing step.

Various embodiment of the invention disclosed in the following relate to electronic circuits used in IoT. Furthermore, IoT may be implementing biomedical measurements. Herein, the term biomedical measurement is generally used to refer to electronic measurement of biomedical substance or organic material. The biomedical substance may be for example body or tissue of a living organism (e.g. human being) or a cell sample. Examples of biomedical measurements comprise for example electrocardiography (ECG) measurements, electrodermal activity (EDA, aka GSR galvanic skin response) measurements, body conductivity (aka bioimpedance) measurements, and impedance plethysmography (IPG) measurements, e.g. impedance cardiography (ICG).

Figure 3:
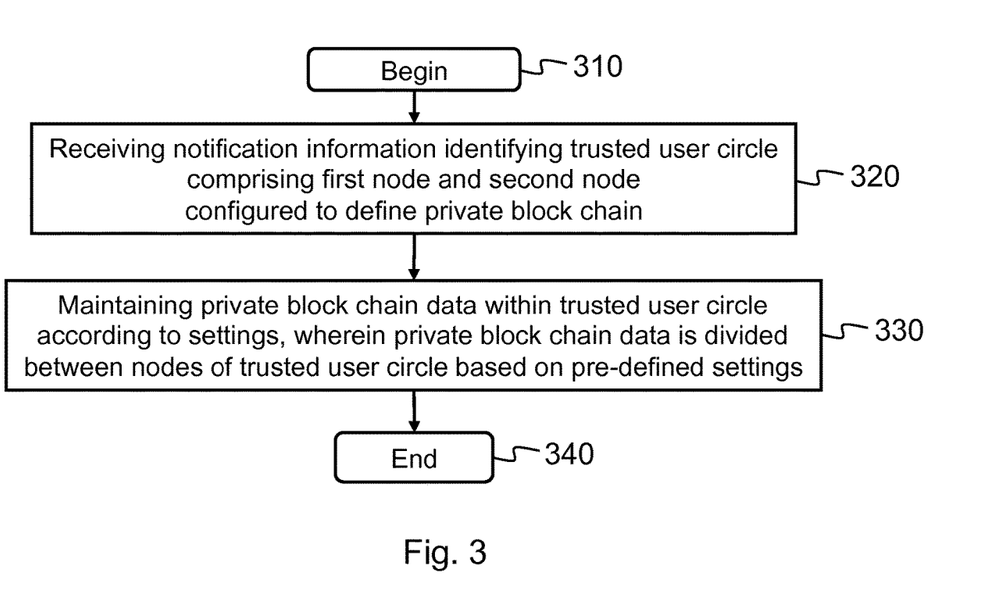
FIG. 3 shows a flow diagram illustrating a method according to an example embodiment of the invention.

FIG. 3 shows a flow diagram illustrating a method for utilizing a block chain infrastructure to define a trusted circle comprising at least two nodes of a plurality of nodes according to an example embodiment of the invention. The method begins at step 310. In step 320, notification information identifying a trusted user circle comprising the first node and a second node is received, by a first node, wherein the first node and the second node are configured to define a private block chain. In step 330, private block chain data is maintained within the trusted user circle according to pre-defined settings, wherein the private block chain data is divided between nodes of the trusted user circle based on the pre-defined settings. The method ends at step 340.

Figure 4:
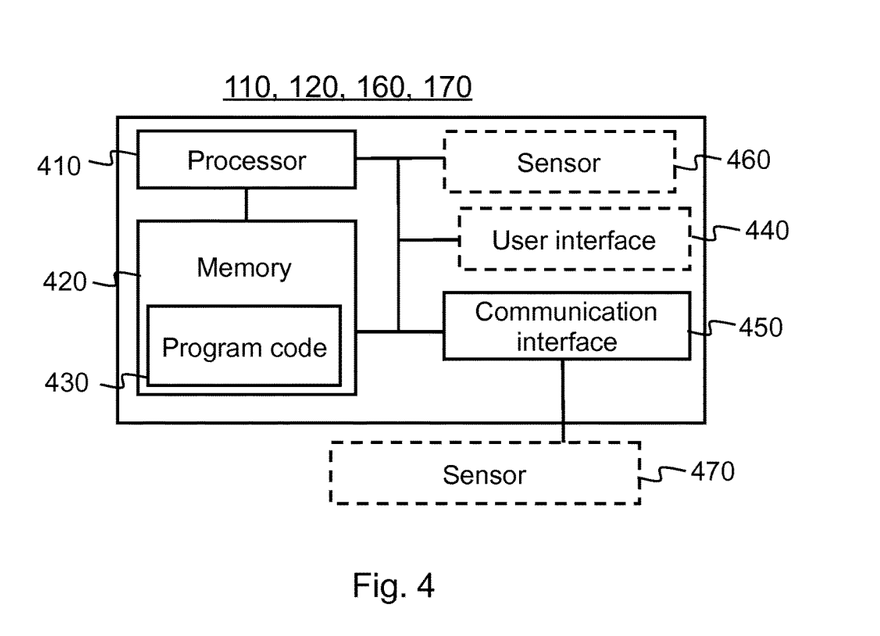
FIG. 4 shows a block diagram of a device of an example embodiment.

FIG. 4 presents an example block diagram of a node or device 110, 120, 160, 170 in which various embodiments of the invention may be applied. The device 110, 120, 160, 170 may be a sensor device, a smart device, a user device, a user wearable device or a hub device. All elements described in FIG. 4 are not necessary to be implemented in the same device.

In an embodiment, a sensor 470 may be implemented as a separate device (e.g. a user wearable device) communicating via the communication interface 450 with other device, or as an integrated sensor 460 within the device. The user interface 440 may be implemented also in another device connected via a communication interface 450 to the device 110, 120, 160, 170. Such device may comprise a mobile phone, a smart phone, or a tablet, for example. In an embodiment, the device 110, 120, 160, 170 may communicate with a plurality of sensors 460, 470, both internal and external sensors, and of a plurality of users.

The general structure of the device 110, 120, 160, 170 comprises a user interface 440, a communication interface 450, a processor 410, and a memory 420 coupled to the processor 410. The device 110, 120, 160, 170 further comprises software 430 stored in the memory 420 and operable to be loaded into and executed in the processor 410. The software 430 may comprise one or more software modules and can be in the form of a computer program product. Not all elements of FIG. 4 are necessary but optional for the device 110, 120, 160, 170 such as the user interface 440 and sensors 460, 470.

The processor 410 may be, e.g., a central processing unit (CPU), a microprocessor, a digital signal processor (DSP), a graphics processing unit, or the like. FIG. 4 shows one processor 410, but the device 110, 120, 160, 170 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The device 110, 120, 160, 170 may comprise a plurality of memories. The memory 420 may be constructed as a part of the device 110, 120, 160, 170 or it may be inserted into a slot, port, or the like of the device 110, 120, 160, 170 by a user. The memory 420 may serve the sole purpose of storing data, or it may be constructed as a part of an apparatus serving other purposes, such as processing data.

The user interface 440 may comprise circuitry for receiving input from a user of the device 110, 120, 160, 170, e.g., via a keyboard, a touchpad, a motion sensor, a touch-screen of the device 110, 120, 160, 170 speech recognition circuitry, gesture recognition circuitry or an accessory device, such as a headset or a remote controller, for example. Furthermore, the user interface 440 may comprise circuitry for providing output for the user via a display, a speaker, a touch-sensitive display or a tactile feedback device, for example.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 450 may be integrated into the device 110, 120, 160, 170 or into an adapter, card or the like that may be inserted into a suitable slot or port of the device 110, 120, 160, 170. The communication interface module 450 may support one radio interface technology or a plurality of technologies. The communication interface module 450 may support one wired interface technology or a plurality of technologies. The device 110, 120, 160, 170 may comprise a plurality of communication interface modules 450.

In an embodiment, the communication interface module 450 may comprise location modules for tracking location of the device 110, 120, 160, 170. Such location modules may comprise a module for satellite based global positioning system (e.g. GPS), a module for cellular based positioning system, a module for wireless non-cellular positioning system (e.g. Wi-Fi) or a module for hybrid positioning system, for example.

A skilled person appreciates that in addition to the elements shown in FIG. 4, the device 110, 120, 160, 170 may comprise other elements, such as microphones, speakers, sensors, cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the device 110, 120, 160, 170 may comprise a disposable or rechargeable battery (not shown) for powering when external power if external power supply is not available.

In an embodiment, the device 110, 120, 160, 170 comprises an additional sensor 460, 470 for providing metadata associated to the transaction data (e.g. biometric information). The metadata may comprise at least one of the following: temperature information; pressure information; fingerprint information; retinal scan information; movement information; location information; and humidity information.

In an embodiment, the device 110, 120, 160, 170 comprises speech or gesture recognition means. Using these means, a pre-defined phrase or a gesture may be recognized from the speech or the gesture and translated into control information for the device 110, 120, 160, 170.

In an embodiment, the remote device 140 may correspond to the block structure of FIG. 4 without sensors 460, 470, for example.

User wearable devices and sensors thereof provided in various embodiments may be used for example in heart rate detection, blood pressure detection, lactate level detection, respiration, impedance cardiography (ICG), bioelectrical impedance analysis (BIA), fingerprint detection, retinal scan detection, electrical impedance tomography (EIT) and electrodermal activity (EDA, aka GSR galvanic skin response) measurements, for example.

Figure 5:
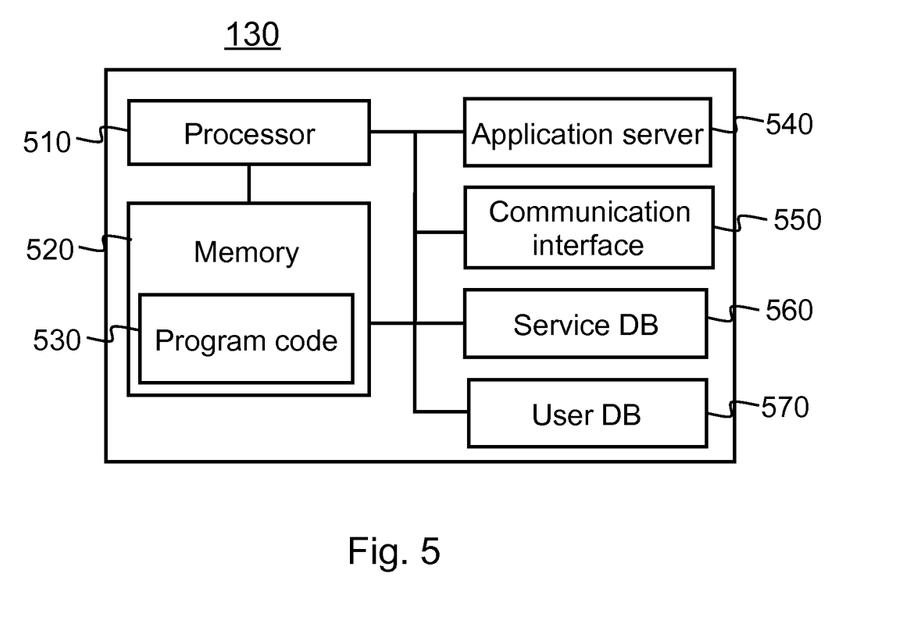
FIG. 5 shows a block diagram of a server apparatus of an example embodiment.

FIG. 5 shows a block diagram of a server apparatus 130 of an example embodiment.

The general structure of the server apparatus 130 comprises a processor 510, and a memory 520 coupled to the processor 510. The server apparatus 130 further comprises software 530 stored in the memory 520 and operable to be loaded into and executed in the processor 510. The software 530 may comprise one or more software modules and can be in the form of a computer program product.

The processor 510 may be, e.g., a central processing unit (CPU), a microprocessor, a digital signal processor (DSP), a graphics processing unit, or the like. FIG. 5 shows one processor 510, but the server apparatus 130 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 520 may be constructed as a part of the server apparatus 130 or it may be inserted into a slot, port, or the like of the server apparatus 130 by a user. The memory 520 may serve the sole purpose of storing data, or it may be constructed as a part of an apparatus serving other purposes, such as processing data.

The communication interface module 550 implements at least part of data transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 550 may be integrated into the server apparatus 130, or into an adapter, card or the like that may be inserted into a suitable slot or port of the server apparatus 130. The communication interface module 550 may support one radio interface technology or a plurality of technologies. Configuration information between the nodes 110, 120, 160, 170 and the system server 130 may be transceived using the communication interface 550. Similarly, account creation information between the system server 130 and a service provider may be transceived using the communication interface 550.

An application server 540 provides application services e.g. relating to the user accounts stored in a user database 570 and to the service information stored in a service database 560. The service information may comprise content information, content management information or metrics information, for example. The service information may also comprise information relating to transaction data, history data of earlier transaction data, or block chains, for example.

A skilled person appreciates that in addition to the elements shown in FIG. 5, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

In an embodiment, a trusted circle may be initially setup by any trusted node within the system according to pre-defined settings. Hashing and encrypting may be balanced for nodes having better processing power, security, memory capacity and/or powering. Hashing and encryption may also be user changeable based on the user settings or based on the local system administrator, for example.

Without in any way limiting the scope, interpretation, or application of the claims appearing below, a technical effect of one or more of the example embodiments disclosed herein is that an improved construction and storage of transaction data of block chain is provided that allows small nodes to actively participate in a block chain network. Especially in IoT (Internet of Things) network the collaborating nodes have hash power enough to be an active part of securing the network.

Another technical effect of one or more of the example embodiments disclosed herein is that security of sensitive transaction data transmission between different devices and stakeholders is improved. Another technical effect of one or more of the example embodiments disclosed herein is that reliability of user transaction data, relating to a plurality of user owned nodes, is improved.

Another technical effect of one or more of the example embodiments disclosed herein is that nodes are allowed to divide block chain data and associated data while still being able to verify the validity of the data.

Yet another technical effect of one or more of the example embodiments disclosed herein is that less complex systems and nodes are required with limited storage and processing requirements.

Without in any way limiting the scope, interpretation, or application of the claims appearing below, a technical effect of one or more of the example embodiments disclosed herein is that an improved transaction data service system is provided.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

The invention claimed is:

1. A method, comprising:
utilizing a block chain infrastructure to define a trusted circle comprising at least two nodes of a plurality of nodes, comprising:
receiving, by a first node, notification information identifying a trusted user circle comprising the first node and a second node, wherein the first node and the second node are configured to define a private block chain;
based on the identifying, receiving, by the first node, instructions information to pair with the second node to collaborate and store in a distributed ledger with the second node private block chain data associated with the private block chain of the trusted circle;
maintaining with the distributed ledger the private block chain data of the trusted user circle according to pre-defined settings, wherein the private block chain data is divided between nodes of the trusted user circle based on the pre-defined settings, and wherein transaction data of the private block chain is hashed using a cryptographic hashing function; and
facilitating verification and authentication of the transaction data of the private block chain data of the first node and the second node of the trusted user circle according to the terms of the pre-defined settings of the private block chain.

2. The method of claim 1, further comprising:
receiving, by the first node, notification information comprising user identification information associated with the trusted user circle.

3. The method of claim 1, wherein the notification information is received via at least one of the following short-range communication protocol:
Near Field Communication, Bluetooth™, Wi-Fi, Ethernet, ZigBee, powerline communications, and Universal Serial Bus.

4. The method of claim 1, wherein the instructions information is received comprising at least one of:
using a block chain transaction, or
using a jumper or a switch being set within the first node, or
via at least one of the following short-range communication protocol:
NFC (Near Field Communication), Bluetooth™, Wi-Fi, Ethernet, ZigBee, powerline communications, and USB (Universal Serial Bus).

5. The method of claim 1, wherein the facilitating verification and authentication of the transaction data is for a third node, and wherein the cryptographic hashing function to create the cryptographic hash block is associated with a digital signature of the third node.

6. The method of claim 1, wherein the pre-defined settings comprising at least one of an agreement and a smart contract of the trusted user circle.

7. The method of claim 1, wherein the first node and the second node comprising Internet of Things devices.

8. The method of claim 1, wherein the private block chain data is divided between nodes of the trusted user circle using a self-balancing binary search tree, wherein the self-balancing binary search tree comprising AVL tree.

9. The method of claim 1, wherein the private block chain data is divided between nodes of the trusted user circle using a Patricia tree.

10. The method of claim 1, wherein the trusted user circle comprising a gateway node configured to control access of other nodes within the trusted user circle to external network outside the trusted user circle.

11. The method of claim 1 further comprising:
maintaining, by each node of the trusted user circle, information of other trusted nodes of the trusted user circle, wherein the information of other trusted nodes comprises a public key of each trusted node, wherein the information of other trusted nodes comprising a node identifier of a trusted node, wherein the node identifier comprising a MAC (Media Access Control) address.

12. The method of claim 11, wherein the information of other trusted nodes comprises a public key of each trusted node.

13. The method of claim 12, wherein the information of other trusted nodes comprising a node identifier of a trusted node.

14. The method of claim 13, wherein the node identifier comprising a Media Access Control address.

15. A device, comprising:
a communication interface for transceiving information;
at least one processor; and
at least one memory including computer program code;
the at least one memory and the computer program code configured to, with the at least one processor, cause the device to:
receive notification information identifying a trusted user circle comprising the device and a second network node, wherein the device and the second node are configured to define a private block chain;
based on the identifying, receive, by the device, instructions information to pair with the second network node to collaborate and store in a distributed ledger private block chain data associated with the private block chain of the trusted circle; and
maintain with the distributed ledger the private block chain data within the trusted user circle according to pre-defined settings, wherein the private block chain data is divided between nodes of the trusted user circle based on the pre-defined settings, and wherein transaction data of the private block chain is hashed using a cryptographic hashing function; and
facilitating verification and authentication of the transaction data of the private block chain data of the first node and the second node of the trusted user circle according to the terms of the pre-defined settings of the private block chain.

16. The device of claim 15 comprising an IoT (Internet of Things) device.

17. The device of claim 15 comprising a gateway node.

18. The device of claim 15 comprising at least one of the following:
an industrial machine;
a sensor;
an utility meter;
a personal computer;
a smartphone;
a PDA;
an Internet tablet;
a network attached storage (NAS); and
a user device.

19. A computer program embodied on a computer readable non-transitory medium comprising computer executable program code, which when executed by at least one processor of a device, causes the device to:
receive, by a first node, notification information identifying a trusted user circle comprising the first node and a second node, wherein the first node and the second node are configured to define a private block chain;
based on the identifying, receive instructions information to pair with the second network node to collaborate and store in a distributed ledger private block chain data associated with the private block chain of the trusted circle; and
maintain with the distributed ledger the private block chain data within the trusted user circle according to pre-defined settings, wherein the private block chain data is divided between nodes of the trusted user circle based on the pre-defined settings, and wherein transaction data of the private block chain is hashed using a cryptographic hashing function; and
facilitating verification and authentication of the transaction data of the private block chain data of the first node and the second node of the trusted user circle according to the terms of the pre-defined settings of the private block chain.

* * * * *